US011889200B2

United States Patent
Madison et al.

(10) Patent No.: US 11,889,200 B2
(45) Date of Patent: Jan. 30, 2024

(54) METHODS AND SYSTEMS FOR GENERATING A HIGH-RATE VIDEO FOR A CAMERA IN MOTION

(71) Applicant: Thales Defense & Security, Inc., Clarkburg, MD (US)

(72) Inventors: Richard Madison, Bedford, MA (US); Olegs Mise, North Andover, MA (US)

(73) Assignee: THALES DEFENSE & SECURITY, INC., Clarksburg, MD (US)

( * ) Notice: Subject to any disclaimer, the term of this patent is extended or adjusted under 35 U.S.C. 154(b) by 0 days.

(21) Appl. No.: 17/643,035

(22) Filed: Dec. 7, 2021

(65) Prior Publication Data
US 2023/0179874 A1 Jun. 8, 2023

(51) Int. Cl.
*H04N 23/80* (2023.01)
*H04N 13/332* (2018.01)
*G06T 3/00* (2006.01)
*G06T 7/20* (2017.01)

(52) U.S. Cl.
CPC ........... *H04N 23/80* (2023.01); *G06T 3/0093* (2013.01); *G06T 7/20* (2013.01); *H04N 13/332* (2018.05)

(58) Field of Classification Search
CPC ........ H04N 23/90; H04N 13/296; H04N 7/18; H04N 23/80; H04N 13/344; H04N 23/63; H04N 23/45
See application file for complete search history.

(56) References Cited

U.S. PATENT DOCUMENTS

| 2017/0180721 | A1 | 6/2017 | Parker et al. |
| 2019/0138889 | A1* | 5/2019 | Jiang ..................... G06N 3/045 |
| 2019/0387168 | A1* | 12/2019 | Smith ..................... G06F 3/013 |
| 2020/0081431 | A1 | 3/2020 | Weiss |

FOREIGN PATENT DOCUMENTS

| KR | 10-2015-0060906 A | 6/2015 |
| KR | 102317007 B1 | 10/2021 |

* cited by examiner

*Primary Examiner* — Samira Monshi
(74) *Attorney, Agent, or Firm* — ArentFox Schiff LLP

(57) ABSTRACT

A method, medium and system for generating a high-rate video for displaying to a user on a display device. The method, medium and system may generate and display the high-rate video by: capturing images for a video at a first frame rate, capturing movement of a display device via a motion sensor, estimating a motion of the camera based on images of the video captured at the first frame rate and the movement of the display device captured via the motion sensor, generating the high-rate video at a second frame rate by up-sampling the video captured at the first frame rate, and displaying the high-rate video to the user.

10 Claims, 6 Drawing Sheets

METHODS AND SYSTEMS FOR GENERATING A HIGH-RATE VIDEO FOR A CAMERA IN MOTION

FIELD

Aspects of the present disclosure relate generally to emulating the ability of a high-rate video camera in motion to output images at a high-rate while images are captured at a lower-rate.

BACKGROUND

Digital Night Vision Cameras (NVCs) can be used along with Augmented Reality (AR) displays to implement digital night vision for dismounted soldiers. Currently, state of the art NVCs operate at frame rates in the range of 15-30 Hz. When a user is watching a video on a monitor physically removed from the user, these frame rates are acceptable.

In some applications, the video may be shown on a display replacing the user's natural vision, e.g., via a helmet-mounted display device. When the user rotates his/her head, his/her brain expects the content that is being displayed (world view) to exactly oppose the continuous head rotation without noticeable delays. For frame rates in the 15-30 HZ range, the brain detects that the video lagging behind the head motion for short periods of time, as if the head were not moving. The brain cannot reconcile this with its own inertial sensors that indicate that the head is moving. Consequently, the user may get nauseated. Even before becoming nauseated, the user will find it easier to interpret complex surroundings, as seen through video, when those contents respond smoothly to head motion rather than appearing to follow the user's head motion briefly and then jerk back to their proper location every 15-30 HZ.

One approach to reduce this side-effect on the user is to capture the video at frame rates in the range of 100-120 Hz. NVCs, however, are used during various night levels. Operating the NVC at night level 4 or 5 requires long exposure times, which forces the sensor frame rate to remain in the lower range. As mentioned above, NVCs typically operate at frame rates in the range of 15-30 HZ. Thus, the need to reduce the time between the presentation of the video while the head is in motion (latency) and the NVC low light sensitivity impose conflicting requirements in regards to the frame rate.

There remains an unmet need for efficient and cost effective methods and systems that address both the latency and low light sensitivity requirements for NVCs.

SUMMARY

In light of the above described problems and unmet needs, as well as others, aspects of the design, development, and testing of a system and method for generating a high-rate video for a camera in motion is described herein. Among other things, these aspects may be used for, e.g., helmet-mounted displays, comprising either monocular or binocular displays for a user, and the like.

In an aspect of the disclosure, a method, a computer-readable medium, and a system for generating a high-rate video for a camera in motion are provided. The method, medium and system may generate a high-rate video for displaying on components of a headband, headgear, or helmet, among other displays. Further, the method, medium and system may generate and display the high-rate video by capturing images for a video at a first frame rate, capturing movement of a display device via a motion sensor, estimating a motion of the camera based on images of the video captured at the first frame rate and the movement of the display device captured via the motion sensor, generating the high-rate video at a second frame rate by up-sampling the video captured at the first frame rate, and displaying the high-rate video to the user.

In one aspect, the camera comprises a night-vision camera with low light sensitivity, the camera being operable at a night level selected from night level one to night level five.

In one aspect, the camera comprises a monocular camera.

In one aspect, the motion sensor comprises an inertial measurement unit for capturing inertial information of the user of the display device.

In one aspect, the inertial measurement unit comprises a gyroscope.

In one aspect, the up-sampling comprises: interpolating images of the video captured at the first frame rate using geometrical warping thereby causing content of the high-rate video to be displayed counteracting the movement of the display device.

In one aspect, the first frame rate comprises a frame rate between 15 HZ and 30 HZ, and the second frame rate comprises a frame rate between 100 Hz and 140 Hz.

In one aspect, the display device is mountable at least on one of: a helmet, a headband, a headgear, or clothing wearable by the user, or on a vehicle occupied by the user.

In one aspect, the high-rate video is displayable to replace a natural vision of the user.

In one aspect, the high-rate video is displayable to assist a natural vision of the user.

In one aspect, a method, medium and system are provided for displaying a high-rate video emulating a camera in motion while capturing images at a low frame rate. For a current frame to be displayed, the method, medium and system may display the high-rate video by determining whether or not an image captured by a camera is available, and when an image captured by the camera is available for the current frame, displaying the image captured by the camera and proceeding to a next frame. When the image captured by the camera is not available for the current frame, determining, for the current frame, whether or not an image is received from an image generator, wherein the image is generated by interpolating images using a geometrical warping algorithm based on input received from a motion sensor, when the image is received from the image generator, displaying the image received from the image generator, and proceeding to process the next frame.

The method, medium and system may provide a display on a Helmet-Mounted Display (HMD) and may comprise a camera, and a motion sensor that includes at least an inertial measurement unit (IMU).

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

Various example aspects of the systems and methods will be described in detail, with reference to the following figures, wherein.

DETAILED DESCRIPTION

Figure 1:
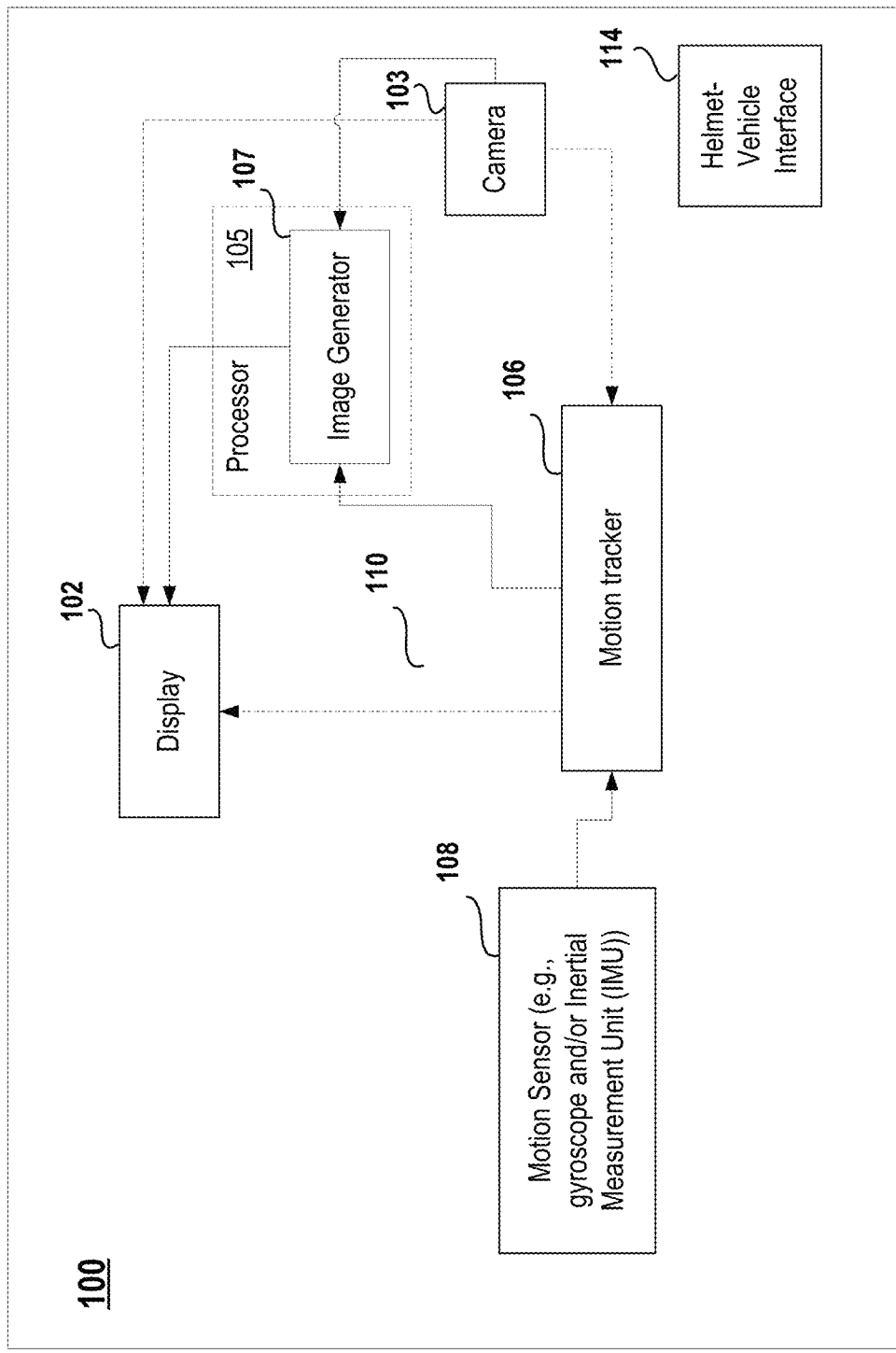
FIG. 1 is diagram illustrating an example system for generating a high-rate video for a camera in motion, in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of motion tracking systems will now be presented with reference to various apparatuses and methods. These apparatuses and methods will be described in the following detailed description and illustrated in the accompanying drawings by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to include instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, firmware, or any combination thereof. If implemented in software, the functions may be stored on or encoded as one or more instructions or code on a computer-readable medium. Computer-readable media include computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above are also included within the scope of computer-readable media.

Accordingly, in one or more aspects, the functions described below may be implemented in any one of a HMD, or a Head-Worn Display ("HWD"). Further, these terms may also be used interchangeably with the phrase "video display for a user/pilot."

Helmet, body or vehicle mounted displays may need to provide a video output in which surroundings do not jitter in position at 15-30 HZ, so that the user can visually track those objects while turning his/her head and also watch the video without becoming nauseated. As mentioned above, NVCs typically capture images at a low frame rate, e.g., at a frame rate between 15 HZ and 30 HZ. In contrast, inertial information for estimating the motion of the camera itself may be available at a high rate (e.g. 100 HZ). For example, when the display is head-mounted, information about the head movement of the head of the user may be captured using gyroscope, accelerometer, visual-inertial navigation systems, etc., at higher rates and with minimal latency. For instance, an IMU sampling rate of 100 HZ enables inertial information to be captured every 1/100 of a second. The present disclosure describes a method of using the low rate video along with the high rate inertial information to estimate the motion of the camera. Further, the method of the present disclosure emulates images that would have been produced if the camera in motion had been capturing images at the high rate. A geometrical warping algorithm is used to warp the low rate imagery captured by the camera to emulate an effect a camera motion would produce on image content if images had been captured at high rate. For example, the method of the present disclosure may produce/output 100 HZ video from a slower 20 HZ video source/input by interpolating images using a geometrical warping that causes the content of the video to counteract head rotation, as the brain expects the displayed content to exactly oppose continuous head rotation. The interpolation to 100 HZ, would be fast enough to avoid nausea and to allow users to track surroundings visually. This approach may also be referred to as "up-sampling." Thus, the method of the present disclosure allows a night vision camera which captures images at a low frame rate to be displayed to the user, e.g., on a head-mounted display, while the displaying is performed at a high frame rate. In one aspect, the display video is produced while counteracting the head-rotation of the wearer. In another aspect, the display video is produced while counteracting both the head-rotation and the head-translation of the wearer.

Referring to FIG. 1, therein illustrated is a representative diagram of an example system 100 for generating a high-rate video for a camera in motion, according to an aspect of the present disclosure. The system 100 may include a display 102, a camera 103, a motion sensor 108, a motion tracker 106, and an image generator 107, among other elements. In one aspect, components of the system 100 may be mounted on a helmet, body, goggles, or any other object wearable by the user. In one aspect, the image generator 107 may be implemented inside a processor 105.

The camera 103 may be used for capturing a video at a first frame rate (e.g., a slow frame rate), the motion sensor 108 may be used for capturing a movement of a display device, the motion tracker 106 may be used for estimating a motion of the camera based on images of the video captured at the first frame rate and the movement of the display device, the image generator 107 may be used for generating the high-rate video at a second frame rate by up-sampling the video captured at the first frame rate, and the display 102 may be used for displaying the high-rate video to the user. The images of the high-rate video may be output emulating a video captured at the second frame rate.

Figure 2:
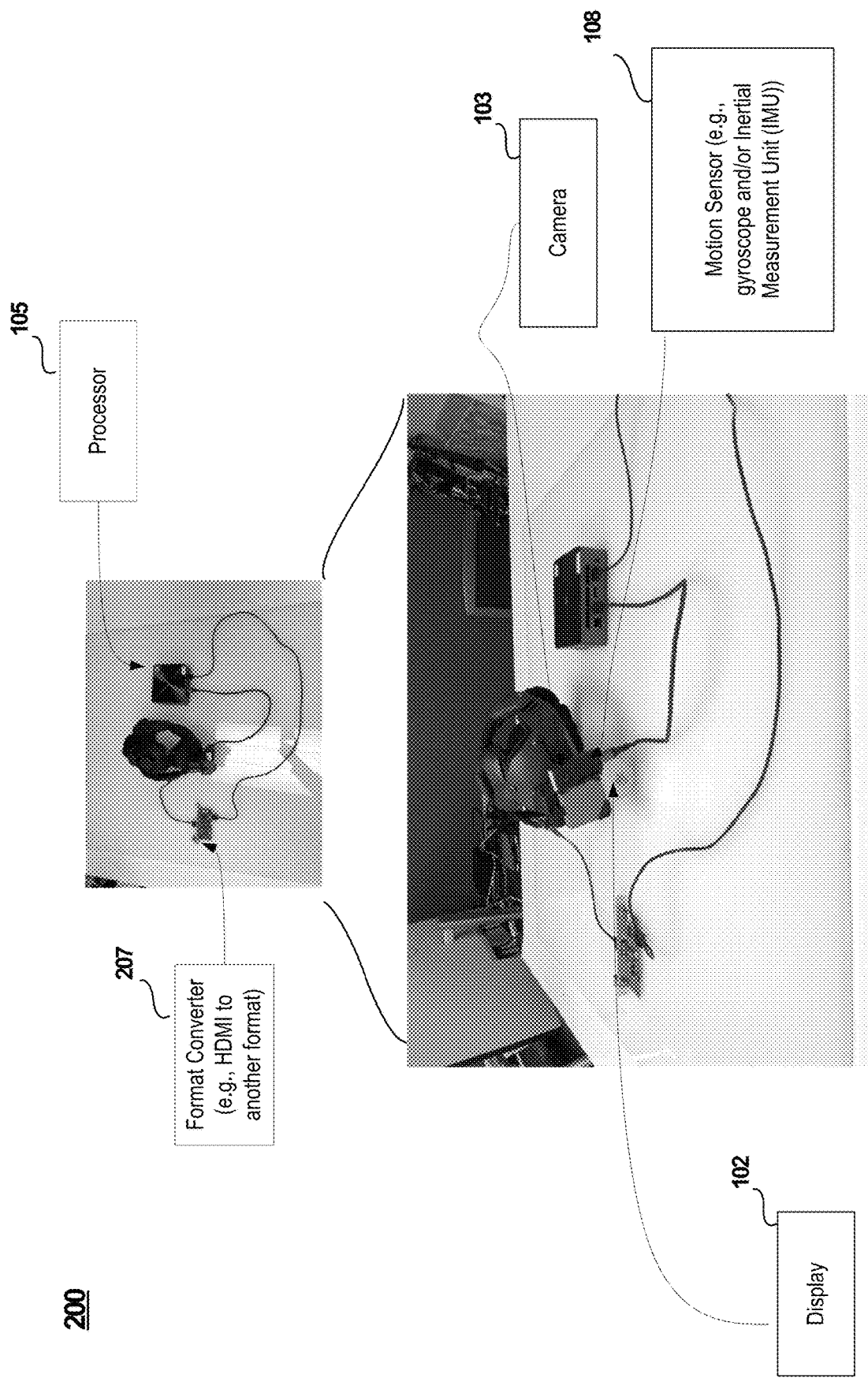
FIG. 2 is an example helmet on which components of the system of FIG. 1 are mounted, in accordance with aspects of the present disclosure.

FIG. 2 illustrates an example helmet 200 on which components of the system 100 are mounted. The helmet 200 may further include one or more processors 105 and format converter 207 (e.g., for converting from HDMI to another format). In one aspect, the format converter 207 may comprise a graphics card.

In one aspect, the motion sensor 108 may comprise an Inertial Measurement Unit (IMU) for capturing inertial information of the user wearing the display device 102. For example, the head rotation may be measured using an inertial measurement unit or a visual-inertial navigation system. When the display 102 is mounted on the helmet 200, it may be referred to as a HMD. In one aspect, the IMU includes a gyroscope.

The display 102 may be positioned for a right eye or a left eye of a user.

In one aspect of the disclosure, the display 102 may be a see-through display in which the imagery is nominally collimated and verged to infinity.

In one aspect, two displays may be used together to provide a binocular display system for the user. Each of the two displays may be positioned for a respective eye of the user.

In one aspect, the image generator 107 of FIG. 1 may be mounted on the helmet 200 or communicatively coupled to components mounted on the helmet 200. In one aspect, the communication between components mounted on the helmet 200 and components in a separate control unit, e.g., a control unit implemented in a vehicle (not shown), may be performed via a Helmet-Vehicle Interface.

In one aspect, the display 102 may be coupled to the motion sensor 108. In one aspect, the display 102 may contain the motion sensor 108. In one aspect, the motion tracker 106, may comprise, for example, a hybrid optical-based inertial tracker (HObIT), described in more detail below. The motion sensor 108 may be, for example, a NavChip™ IMU produced by Thales Visionix® of Clarksburg, MD which is a Microelectromechanical systems (MEMS)-based high-precision IMU.

In one example implementation, the motion tracker 106 may be electrically connected to the display 102 via a transfer wire 110. In another aspect of the disclosure, the display 102, may also be electrically connected to an aircraft or other vehicle via a Helmet-Vehicle Interface (HVI) 114. In another aspect of the disclosure, the motion tracker 106 and the display 102 may be electrically connected to an aircraft or other vehicle via a Helmet-Vehicle Interface (HVI) 114. In addition, for the binocular display system described above, the two displays may be configured to communicate with each other.

Alternatively to the electrical connections described above with reference in FIG. 1, in some implementations, the various components may be wirelessly, optically, or otherwise coupled to one another.

The image generator 107 may receive tracking data relating to the HMD 102, as described further below, and may communicate a generated image to the display 102. In one aspect, the image generator 107 may be integrated with the HMD 102. In another aspect, the generated images may be sent to the HMD via the HVI 114. The image generator 107 may also receive input from a vehicle and/or aircraft's mission computer, including, e.g., symbol data and data from an aircraft Global Positioning System (GPS)/Inertial Navigation System (INS). Thus, the helmet 200 along with the motion tracker 106, and display 102 may communicate with a control unit (not shown), such as a cockpit mounted control unit, through the HVI 114, for example.

Referring to FIG. 1, in one aspect, the camera 103 may comprise a night-vision camera with low light sensitivity. For example, the camera 103 may be operable at a night level selected from night level 1 to night level 5

In one aspect, the camera 103 may comprise a monocular camera.

In one aspect, the camera 103 may comprise a night vision camera. For example, the night vision camera may provide an input signal to another device that performs a GPS denied navigation. For instance, the night vision camera may provide an input to a motion tracker which may then perform the GPS denied navigation.

In one aspect, the camera 103 and the motion tracker 106 may be integrated. The motion tracker 106 of the present disclosure may track rotation and position. Changes in acceleration and rotation may be measured using any number of redundant accelerators and gyroscopes. In one aspect, angular rate data and linear acceleration data obtained from the accelerators and gyroscopes may be used to determine changes in velocity and angular displacement. The angular displacement and changes in velocity may be used for tracking both orientation and position.

In one example, the motion tracker 106 may comprise an IS-1500 tracker. The IS 1500 tracker typically operates at 20 HZ to monitor position and orientation.

In one aspect, the motion tracker 106 may estimate the motion of the camera 103 in accordance with methods used for GPS-denied navigation. In another aspect, the motion tracker 106 may estimate the motion of the camera in accordance with methods used for augmenting symbology onto head mounted displays, such as display 102.

In one aspect, the motion sensor 108 of the present disclosure may take into account head rotation (3D rotation) but not head translation. In another aspect, the motion sensor 108 of the present disclosure may take into account both head rotation and head translation.

In order to reduce the amount of computation, independent motions of objects in view may be considered separately from the method of the present disclosure. For example, if motions of objects in view are to be tracked, the present method may receive such information from a separate unit dedicated for tracking such objects.

In one aspect, the up-sampling by the image generator 107 may comprise interpolating images of the video captured at the first frame rate using geometrical warping thereby causing content of the high-rate display video to counteract the movement of the display device. For example, geometric warping causes content of the video to counteract the head rotation of the user wearing the helmet 200 on which the display device 102 is mounted. Thus, the information about the head rotation and translation may be used to estimate the amount of rotation and translation needed for counteracting the movement of the display device. Once the amount of rotation and translation is estimated, the images of the video captured at the first frame rate may be interpolated using geometric warping thereby creating the high-rate display video to counteract the movement of the display device.

In one aspect, the first frame rate may comprise a frame rate between 1 HZ and 60 HZ and the second frame rate may comprise a frame rate between 100 Hz and 250 Hz.

In one aspect, the high-rate video may be displayable to assist the natural vision of the user. For example, the high-rate video may be used to display symbology that appears to stick to objects in the world.

In one aspect, the high-rate video may be displayable to replace the natural vision of the user. For example, intensified imagery may be displayed to the user when it is too dark to see.

In one aspect, the display device 102 may be mountable at least on one of: a helmet (e.g., as shown in FIG. 2), a headband, a headgear, or clothing wearable by the user, or on a vehicle occupied by the user.

Figure 3:
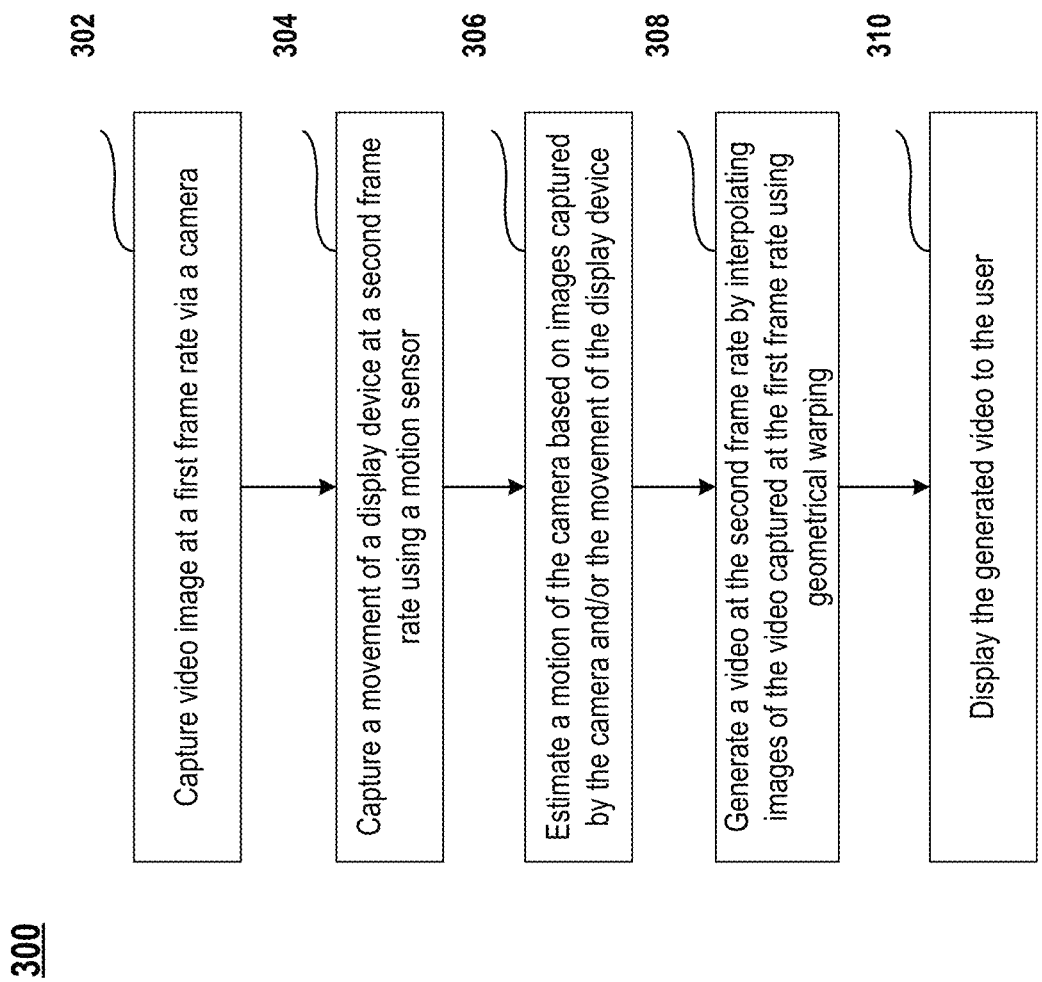
FIG. 3 is an example flowchart for a method for generating a high-rate video for a camera in motion, in accordance with aspects of the present disclosure.

Referring now to FIG. 3, therein shown is an example flowchart for a method for generating a high-rate video for a camera in motion, in accordance with aspects of the present disclosure.

At block 302, the method 300 may capture video images at a first frame rate. For example, a camera 103 may be used for capturing images at a frame rate of 1 HZ-60 HZ.

At block 304, the method 300 may capture a movement of the display device at a second frame rate. For example, a motion sensor 108, e.g., an IMU, may be used for capturing inertial information of the user wearing the display device 102. For example, the head rotation of the person wearing the helmet on which the display is mounted may be measured using an inertial measurement unit or a visual-inertial navigation system.

At block 306, the method 300 estimates a motion of the camera capturing the images at the first frame rate. For example, the motion tracker 106 may be used to estimate the motion of the camera 103 based on images captured by the camera 103 at the frame rate of 1 HZ-60 HZ, and/or the movement of the display device captured by the motion sensor 108 at a second frame rate, e.g., 100 HZ.

At block 308, the method 300 may generate a high-rate video at the second frame rate. For example, the image generator 107 may interpolate images of the video captured at the first frame rate using geometrical warping thereby causing content of the resulting high-rate video to be displayable to counteract the movement of the display device. For example, the interpolation of the images enables images to remain still only for about $\frac{1}{100}$ of a second-thereby resulting in a frame rate of 100 HZ.

At block 310, the method 300 displays the high-rate video to the user. For example, the high-rate video generated in block 308 may be displayed on display device 102.

Figure 4:
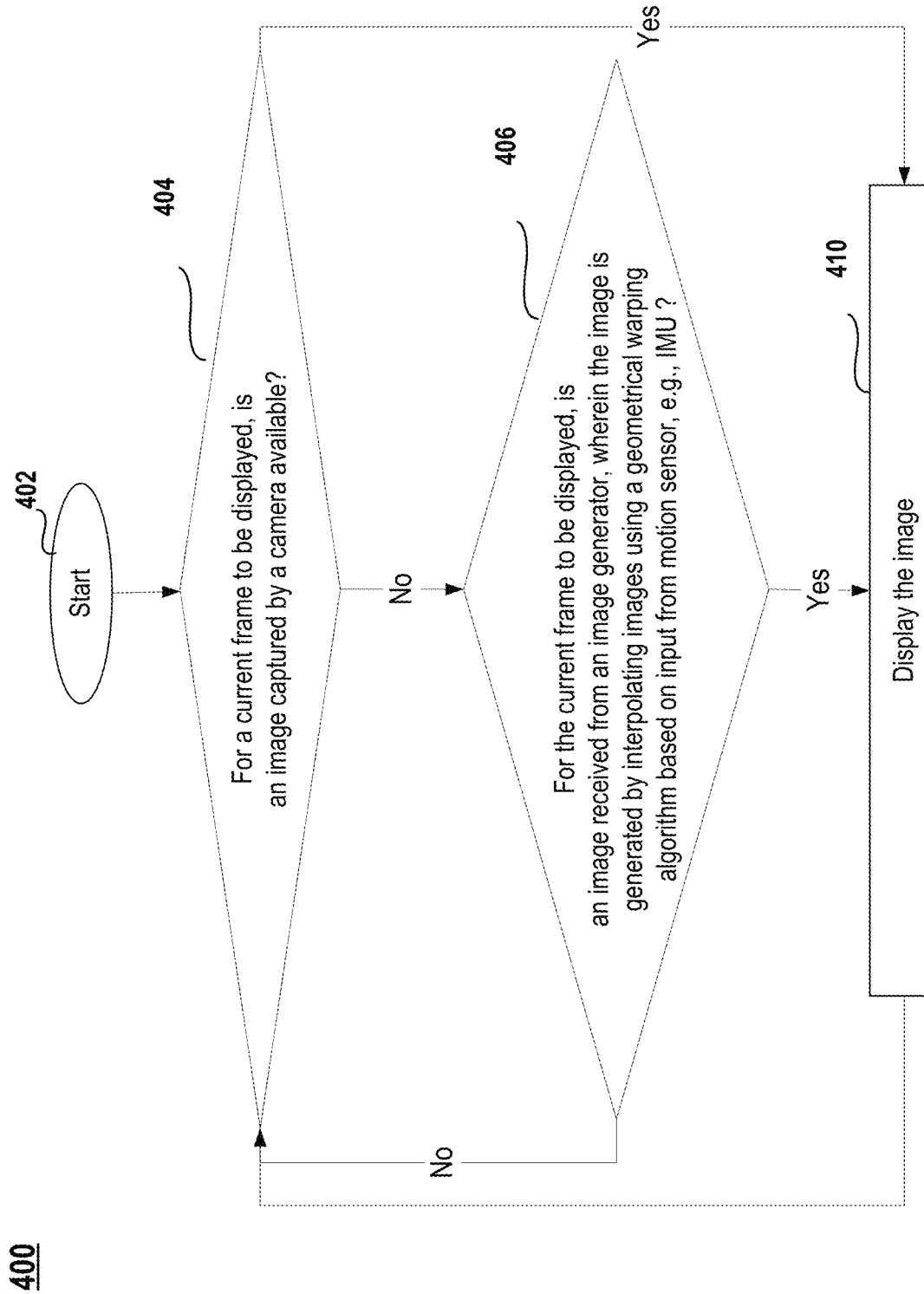
FIG. 4 is an example flowchart for a method for displaying a high-rate video emulating a camera in motion while capturing images at a low frame rate, in accordance with aspects of the present disclosure.

Referring now to FIG. 4, therein shown is an example flowchart for a method for displaying a high-rate video emulating a camera in motion while capturing images at a low frame rate, in accordance with aspects of the present disclosure. For example, the display 102 may receive images from the camera 103 and the image generator 107. For each frame to be displayed (e.g., within a given $\frac{1}{100}$ of a second), the display may select an image to be displayed from either the output of the camera 103 or the output of the image generator 107. For a given frame, when an image is readily available from the camera 103, the display 102 selects the output of the camera 103. Otherwise, the display 102 may select an image received from the image generator 107. The image received from the image generator 107 may be generated by interpolating images of the video captured by the camera 103 using geometrical warping. The process may be repeated for each frame, sequentially.

Method 400 starts at block 402 and proceeds to step 404.

In block 404, method 400 may determine, for a current frame to be displayed, whether or not an image captured by a camera is available. When an image captured by the camera is available for the current frame, the method proceeds to block 410. Otherwise, the method 400 proceeds to block 406.

In block 406, method 400 may determine, for the current frame, whether or not an image is received from the image generator, wherein the image may be generated by interpolating images using a geometrical warping algorithm based on input from a motion sensor, e.g., IMU 108. When the image is received from the image generator, the method proceeds to block 410. Otherwise, the method 400 returns to block 404.

In block 410, method 400 may display the image and proceed to block 404. The method may continue processing images sequentially for each frame to be displayed. The image from a previous frame may be displayed only until a new image is received from either the camera or the image generator. Therefore, when the image generator generates the video at a higher frame rate than the user's brain can process (e.g., 100 HZ), the latency may be overcome, thereby reducing the chance of the user becoming nauseated and allowing the user to visually track objects shown in the video.

Figure 5:
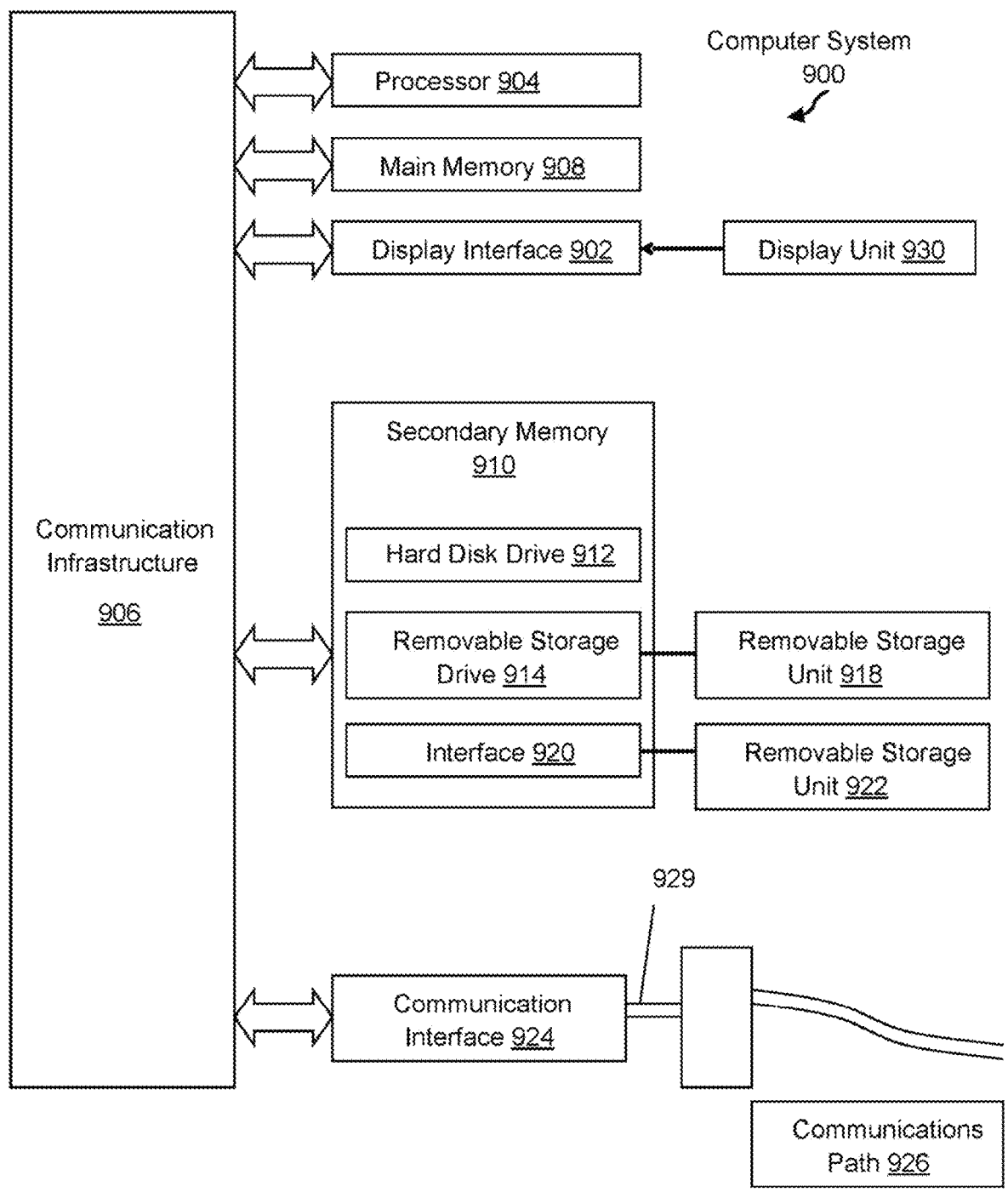
FIG. 5 presents an example system diagram of various hardware components and other features, for use in accordance with aspects of the present disclosure.

FIG. 5 presents an example system diagram of various hardware components and other features, for use in accordance with aspects presented herein. The aspects may be implemented using hardware, software, or a combination thereof and may be implemented in one or more computer systems or other processing systems. In one example, the aspects may include one or more computer systems capable of carrying out the functionality described herein, e.g., in connection with one or more of the motion sensors (e.g., IMUs), displays, INS, and/or related processing within other components in the helmet of FIGS. 1-4. An example of such a computer system 900 is shown in FIG. 5.

Computer system 900 includes one or more processors, such as processor 904. The processor 904 may correspond to components (e.g., image generator, motion tracker) described in connection with the system 100 for generating a high-rate video for a camera in motion. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement the aspects presented herein using other computer systems and/or architectures.

Computer system 900 can include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 929, which may be electronic, electromagnetic, optical or other signals capable of being received by communications interface 924. These signals 929 are provided to communications interface 924 via a communications path (e.g., channel) 926. This path 926 carries signals 929 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 914, a hard disk installed in hard disk drive 912, and signals 929. These computer program products provide software to the computer system 900. Aspects presented herein may include such computer program products.

Computer programs (also referred to as computer control logic) are stored in main memory 908 and/or secondary memory 910. Computer programs may also be received via communications interface 924. Such computer programs, when executed, enable the computer system 900 to perform the features presented herein, as discussed herein. In particular, the computer programs, when executed, enable the processor 904 to perform the features presented herein. Accordingly, such computer programs represent controllers of the computer system 900.

In aspects implemented using software, the software may be stored in a computer program product and loaded into computer system 900 using removable storage drive 914, hard drive 912, or interface 920 to removable storage unit 922. The control logic (software), when executed by the processor 904, causes the processor 904 to perform the functions as described herein. In another example, aspects may be implemented primarily in hardware using, for example, hardware components, such as application specific integrated circuits (ASICs). Implementation of the hardware state machine so as to perform the functions described herein will be apparent to persons skilled in the relevant art(s).

In yet another example, aspects presented herein may be implemented using a combination of both hardware and software.

Figure 6:
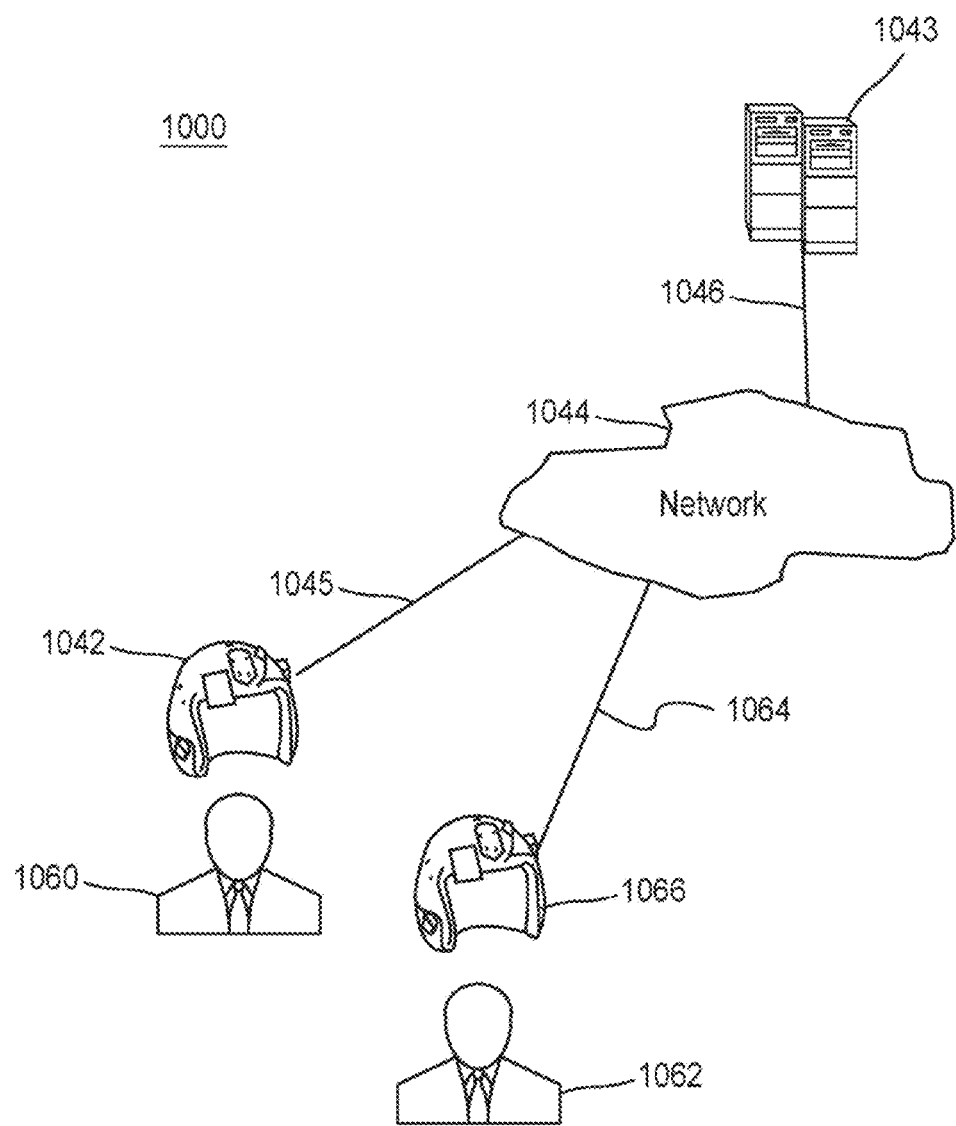
FIG. 6 is a block diagram illustrating various example system components for use in accordance with aspects of the present disclosure.

FIG. 6 illustrates a block diagram of various example system components that may be used in accordance with aspects of the present disclosure. The system 1000 may include one or more accessors 1060, 1062 (also referred to interchangeably herein as one or more "users," such as a pilot) and one or more terminals 1042, 1066 (such terminals may be or include, for example, various features of the motion sensors (e.g., IMUs), displays, INS, and/or related processing within other components in the helmet of FIGS. 1-5) within an overall aircraft or other vehicle network 1044. In one aspect, data for use in accordance with aspects of the present disclosure is, for example, input and/or accessed by accessors 1060, 1062 via terminals 1042, 1066, coupled to a server 1043, such as the symbols, and/or other device having a processor and a repository for data and/or connection to a repository for data, via, for example, a network 1044, such as the Internet, an intranet, and/or an aircraft communication system, and couplings 1045, 1046, 1064. The couplings 1045, 1046, 1064 includes, for example, wired, wireless, or fiber optic links. In another example variation, the method and system in accordance with aspects of the present disclosure operate in a stand-alone environment, such as on a single terminal.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous disclosure is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such

What is claimed is:

1. An apparatus for generating a high-rate video for displaying to a user on a display device, the apparatus comprising:
 a camera for capturing a video at a first frame rate;
 a motion sensor for capturing movement of a display device;
 a motion tracker for estimating motion of the camera based on images of the video captured at the first frame rate and the motion reported by the motion sensor;
 an image generator for generating the high-rate video at a second frame rate by up-sampling the video captured at the first frame rate, wherein images of the high-rate video are output emulating a video captured at the second frame rate, and wherein the up-sampling comprises: extrapolating images of the video captured at the first frame rate using geometrical warping thereby causing content of the high-rate video to be displayed counteracting the movement of the display device; and
 a display for displaying the high-rate video to the user.

2. The apparatus of claim 1, wherein the camera comprises a night-vision camera with low light sensitivity, the camera being operable at a night level selected from night level one to night level five.

3. The apparatus of claim 1, wherein the camera comprises a monocular camera.

4. The apparatus of claim 1, wherein the motion sensor comprises an inertial measurement unit for capturing inertial motion of the display device.

5. The apparatus of claim 1, wherein the motion sensor further comprises a gyroscope.

6. The apparatus of claim 1, wherein the first frame rate comprises a frame rate between 1 HZ and 60 HZ, and the second frame rate comprises a frame rate between 100 HZ and 250 Hz.

7. The apparatus of claim 1, wherein the display device is mountable on at least one of: a helmet, a headband, a headgear, clothing wearable by the user, and a vehicle occupied by the user.

8. The apparatus of claim 1, wherein the high-rate video is displayable to replace or assist the natural vision of the user.

9. A method for generating high-rate video for displaying to a user on a display device, the method comprising:
 capturing, by a camera, images for a video at a first frame rate;
 capturing, by a motion sensor, movement of a display device;
 estimating, by a motion tracker, motion of the camera based on images of the video captured at the first frame rate and the movement of the display device;
 generating, by an image generator, the high-rate video at a second frame rate by up-sampling the video captured at the first frame rate, wherein images of the high-rate video are output emulating a video captured at the second frame rate, wherein the up-sampling comprises: extrapolating images of the video captured at the first frame rate using geometrical warping thereby causing content of the high-rate video to be displayed counteracting the movement of the display device; and
 displaying, via a display, the high-rate video to the user.

10. A method for displaying a high-rate video emulating a camera in motion while capturing images at a low frame rate, the method comprising:
 for a current frame to be displayed, determining whether or not an image captured by a camera is available; and
 when an image captured by the camera is available for the current frame, displaying the image captured by the camera and proceeding to a next frame;
 when the image captured by the camera is not available for the current frame,
  determining, for the current frame, whether or not an image is received from an image generator, wherein the image is generated by extrapolating images using a geometrical warping algorithm based on input received from a motion sensor;
  when the image is received from the image generator, displaying the image received from the image generator; and
  proceeding to process the next frame.

* * * * *